(12) United States Patent
Fukuroi et al.

(10) Patent No.: US 6,452,750 B1
(45) Date of Patent: Sep. 17, 2002

(54) SLIDER INCLUDING A RAIL HAVING A CONCAVE END AND METHOD OF MANUFACTURING SAME

(75) Inventors: Osamu Fukuroi, Tokyo (JP); Ryuji Fujii, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/548,663

(22) Filed: Apr. 13, 2000

(30) Foreign Application Priority Data

Apr. 30, 1999 (JP) ............................................ 11-123515

(51) Int. Cl.[7] .............................. G11B 5/60; G11B 21/21
(52) U.S. Cl. ................................. 360/236.4; 360/235.4; 360/236.6; 360/236.7
(58) Field of Search ......................... 360/236.7, 235.9, 360/235.4, 235.6, 235.8, 236.4, 236.6

(56) References Cited

U.S. PATENT DOCUMENTS 4,670,806 A * 6/1987 Ghose
4,996,614 A * 2/1991 Okutsu
5,323,282 A 6/1994 Kanai et al.
5,997,755 A * 12/1999 Sawada

FOREIGN PATENT DOCUMENTS

| JP | 2187-915 A | | 7/1990 |
| JP | 03-209683 | * | 9/1991 |
| JP | 04-023283 | * | 1/1992 |
| JP | A-6-282831 | | 10/1994 |
| JP | 10-222834 | * | 8/1998 |
| JP | 11-191209 | * | 7/1999 |
| JP | A-11-238214 | | 8/1999 |

* cited by examiner

Primary Examiner—Craig A. Renner
(74) Attorney, Agent, or Firm—Oliff & Berridge, PLC

(57) ABSTRACT

A slider is provided that can implement a magnetic head reducing damage to a magnetic recording medium. The slider includes a body having a surface facing the magnetic recording medium and including at least one rail. The rail has at least one end that is chamfered into a concave curved surface.

4 Claims, 8 Drawing Sheets

RELATED
ART

RELATED
ART

RELATED
ART

RELATED
ART

RELATED
ART

RELATED
ART

SLIDER INCLUDING A RAIL HAVING A CONCAVE END AND METHOD OF MANUFACTURING SAME

BACKGROUND OF THE INVENTION

1. Field of the Invention

The invention relates to a slider for use in a magnetic recording apparatus or the like and a method of working a slider. More particularly, the invention relates to a slider, which is formed by simultaneously multi-bonding many sliders on one substrate and then individually separating the sliders and which requires smoothness of the side and front surfaces thereof, and a working method for cutting the sliders and thereby individually separating the sliders.

2. Description of the Related Art

A slider for a magnetic head for use in a magnetic recording apparatus such as a hard disc driver (hereinafter referred to as HDD) is manufactured through steps generally shown in FIGS. 14A to 14F, for example.

First, a plurality of devices 1 such as a transducer having a function of writing/reading information as the magnetic head is multi-bonded on a substrate 2 such as a ceramic substrate or a silicon wafer (see FIG. 14A).

Then, the substrate 2 is cut so as to be rectangular in shape (see FIG. 14B). Then, the rectangular substrate 2 is further sliced into bars, each of which has a horizontal array of about ten or more devices 1, and bars 3 are individually separated from one another (see FIG. 14C). Heretofore, such cutting has been generally performed by the use of a diamond peripheral cutting edge. Then, each of the separated bars 3 is stuck on a suspension 4 that is a jig, with wax (not shown) or the like (see FIG. 14D). Sticking is adapted to be temporary bonding such that the devices 1 can be separated from the suspension 4 after the devices (sliders) 1 are completely individually separated from one another.

Then, each of the devices 1 arrayed on the bar 3 is worked as the slider. That is, a head slider surface is ground, structures functioning as the slider such as a groove for determining a width of a slider rail and a bleed slot surface are worked, and a head levitation surface, i.e., a slider rail surface is polished so as to have predetermined surface roughness of 0.05 μm or less, for example. Furthermore, an air inlet for functioning as an air bearing surface (hereinafter referred to as ABS) of the slider rail surface is tapered (see FIG. 14E).

After the structure of a principal part of the slider is thus formed, sliders 6, each of which comprises each of the devices 1 worked in a unit of the bar 3, are separated one by one by cutting the bar 3 at a boundary between adjacent sliders 6 (see FIG. 14F). Heretofore, cutting for separating has been also generally done by the use of the diamond peripheral cutting edge.

Then, chamfering (so-called blending) takes place (not shown). In order to prevent the slider from damaging the surface of a magnetic recording medium (a magnetic disk) at the time of contact start/stop when the slider is mounted as a slider head and used in the HDD, chamfering is applied to more particularly an edge of the slider rail surface which is likeliest to contact the surface, additionally an edge line portion which is likely to contact the surface of the magnetic recording medium (the magnetic disk) and so on. Heretofore, the slider for the magnetic head for use in the magnetic recording apparatus such as the HDD has been manufactured through such a manufacturing process.

In the above-described step of working the slider for the magnetic head of the related art, chippings of about 1 μm to 5 μm are, however, produced more particularly at the edge where the surface of the ABS crosses a cut surface obtained by a diamond sharp edge grinding wheel and the edge where a rear surface opposite to the ABS crosses the cut surface obtained by the diamond sharp edge grinding wheel.

The chippings have a problem. Similarly to contamination such as dust, the chippings peel off the slider due to vibration, shock or the like during the use of the HDD, and thus the chippings damage the surface of the magnetic disk as the contamination or cause malfunction such as a read/write error resulting from thermal asperity.

More particularly, in recent years, a further increase in an information recording density has been strongly demanded. The increase in the information recording density requires a further reduction in an amount of magnetic spacing by more precisely controlling and further reducing a height of levitation of the slider from the recording medium. An approach of reducing a conventional height of levitation of about 40 nm to 50 nm by more than half, i.e., to about 10 nm to 20 nm and others have been also proposed. In order to realize the reduced height of levitation with high precision, it is therefore strongly demanded that the ABS is formed with higher accuracy of dimension.

There is a tendency to further reduce the height of levitation of the slider. However, even particles finer than conventional particles enter into a fine gap. Thus, the particles are likelier to damage the surface of the magnetic disk and the surface of the slider than the conventional particles.

When chippings as described above are at the edge line portion where the surface of the ABS crosses the cut surface obtained by the diamond sharp edge grinding wheel, when the edge portion itself has an acute angle, or when malformation due to asperities whose edge has an acute angle occurs at the edge, a contact of the edge with the surface of the magnetic recording medium (the magnetic disk) causes damage to the surface of the magnetic recording medium.

The HDD of the related art is manufactured in a clean room whose cleanness is comparable to the cleanness of class 100 or more for a process of manufacturing LSI in order to prevent contamination from entering the HDD at time of manufacturing. Moreover, an air filter is included in the HDD so as to cope with mainly external contamination. Such an approach allows coping with an entry of contamination during manufacturing and an entry of external contamination.

However, during manufacturing, the contamination produced by peeling of chippings as described above adheres to the cut surface still in the form of chipping. Thus, the chippings are not recognized as a cause of failures. Thus, the chippings are likely to cause malfunction at the time of an actual use of the HDD, but the chippings are not checked and are overlooked. At the time of the actual use of the HDD, the slider having the adhering chippings makes a relative movement over the nearly overall surface of the magnetic disk. Thus, the slider is always located on or near the magnetic disk whenever the chippings peel off. That is, almost all the particles of the peeling chippings always drop onto and adhere to the magnetic disk. Consequently, there is a problem that the particles produced by the peeling of the chippings are extremely likely to damage the surface of the magnetic disk or cause the read/write error as the contamination.

Thus, the chipping or the edge portion having acute angle causes various problems. In order to solve such problems, it is extremely important to chamfer more particularly the edge of the slider. A blending method using a lapping tape disclosed in Japanese Patent Application No. Hei 10-104235 and a method of rounding counters by ion milling are proposed as such a chamfering method.

The method using ion milling is that a shallow groove is previously formed in the edge or corner of an outline of the slider and the edge or corner is etched by using ion milling method. The edge or corner is etched not only vertically but also horizontally. As a result, the edge or corner is rounded, so that R (a radius of curvature) is as small as about 2 µm to 3 µm.

However, the method using ion milling has a problem of redeposition unique to the method. That is, even though ion milling method is used in order to remove chippings, redeposition occurs due to ion milling and redeposit peels off as new particles. Consequently, the method using ion milling has a fatal problem that the particles cause the same problem as the problem caused by chippings.

Moreover, other polishing methods are proposed. In a cutting method using a conventional grinding wheel, in order to eliminate the roughness of each cut surface of the outline of the slider and the chippings, the final cut surfaces of each of the individual sliders separated must be polished or subjected to other processes after the sliders are completely cut into the individual sliders. That is, protrusions of about 2 nm to 10 nm are produced at the edges of the cut surfaces of the sliders individually separated. Moreover, chippings of 1 µm to 5 µm are produced at the edges where the cut surface crosses the ABS. Therefore, the removal of protrusions and chippings requires polishing each edge of each slider. Polishing the edges takes place after separation of the sliders. A technique of thus individually polishing the sliders is proposed in Japanese Patent Laid-open No. Hei 6-282831, for example.

However, a step of lapping each of the cut surfaces of each slider after individually separating the sliders is extremely complicated, and thus the time required for the step is long. That is, in a conventional method in which the individual sliders separated is polished by lapping, a step of attaching each of the individual sliders to a lapping apparatus and lapping four side surfaces of each slider, i.e., the cut surfaces of each slider is an extremely complicated step. Thus, the conventional method has a problem that a throughput of the step is inefficient and thus the step requires a long time.

Moreover, in a lapping method, a depth of chamfering and polishing of the edge generally has a limit of up to about 5 µm, and thus the depth is substantially difficult to be more than 5 µm. When an attempt is made to further reduce the depth of polishing, the lapping method for mechanically polishing the surface cannot avoid the contact of the tape with the ABS of the slider and a slider body (more particularly, a magnetic pole portion or the like). As a consequence, there is a problem that the ABS and the slider body are scratched during polishing.

The invention is designed to overcome the foregoing problems. It is an object of the invention to solve a problem of damage to a recording medium such as a magnetic disk due to more particularly an acute edge line of an edge and harmful protrusions or chippings, thereby providing a slider and a method of working a slider which are capable of implementing a magnetic head that is available with high reliability without causing the damage to the magnetic disk and a read/write error when the magnetic head, for example, is incorporated and used in the HDD.

SUMMARY OF THE INVENTION

A slider of the invention is a slider having a polyhedral outline and having a surface facing a magnetic recording medium, wherein at least one of edges of the outline on the periphery of the surface facing the magnetic recording medium is chamfered into a concave curved surface.

In the slider, the edge on the periphery of the surface facing the magnetic recording medium is chamfered into the concave curved surface. Thus, the surface is an extremely smooth surface having no chipping or protrusion. Moreover, the edge on the periphery of the surface of the slider facing the magnetic recording medium is formed into the concave curved surface in cross section. Thus, even when the slider is inclined to the surface of the magnetic recording medium, it is possible to reduce the probability of strong contact of the slider with the surface of the magnetic recording medium.

More particularly, a cross-sectional shape of the edge of the slider of the invention is suitable for the cross-sectional shape of the edge of the slider which has more severely required satisfying hydrodynamic performance in recent years. If the slider assumes an inclined posture toward the magnetic recording medium due to some external perturbations or the like, the edge of the slider tends to move closer to the surface of the magnetic recording medium. However, in the slider of the invention, the edge has the concave curved surface which is hollowed like an inverted R in cross section. Thus, a dimension of the hollowed portion permits reducing the probability of contact of the slider with the surface of the magnetic recording medium. Moreover, the edge having the concave curved surface shaped like the inverted R in cross section is formed on the periphery of the surface facing the magnetic recording medium. Thus, in the slider of the invention, the cross-sectional shape of the edge allows pressure to be generated on the edge in the direction in which the slider is separated from the surface of the magnetic recording medium, i.e., in a positive direction.

In the slider according to the invention, even if the slider is inclined to the surface of the magnetic recording medium due to some external perturbations, the slider has such a structure that the edge of the slider exerts a force in the direction in which the edge is separated from the surface of the magnetic recording medium. Thus, it is possible to actively avoid a strong contact of the slider with the surface of the magnetic recording medium.

Furthermore, the edge of the surface facing the magnetic recording medium has the concave curved surface having the inverted R shape in cross section. Thus, the concave curved surface functions so as to decelerate airflow colliding with the concave curved surface and then direct the airflow in a horizontal direction, i.e., in the direction parallel to the magnetic recording medium (or the facing surface of the slider facing the magnetic recording medium). That is, for example, even when dust entering from the outside air or other particles is suspended over or adheres to the surface of the magnetic recording medium and the slider moves close to the surface, the edge of the slider according to the invention allows horizontally flowing the dust or particles as well as the airflow just like a fender. Thus, it is possible to prevent the dust or particles from entering into a gap between the magnetic recording medium and the slider. As a result, it is possible to avoid damage such as scratches on the surface of the magnetic recording medium, the surface of the slider or a magnetic head portion due to the dust or particles.

A method of working a slider of the invention having a polyhedral outline and having a surface facing a magnetic recording medium, for chamfering into a concave curved surface at least one of edges of the outline of the slider on the periphery of the surface facing the magnetic recording medium comprises a polishing step of bringing a wire saw into contact with the at least one edge and then pressing the wire saw against the slider while sliding the wire saw in a longitudinal direction, thereby polishing a surface in contact with the wire saw and chamfering the contact surface into the concave curved surface.

Another method of working a slider of the invention having a polyhedral outline and having a surface facing a magnetic recording medium, for chamfering into a concave curved surface at least one of edges of the outline of the slider on the periphery of the surface facing the magnetic recording medium comprises: a multi-bonding step of forming an array of a plurality of sliders on one substrate; a supporting step of allowing a suspension to support the sliders on a rear surface opposite to a front surface of the substrate on which the sliders are multi-bonded; a cutting step of cutting a boundary for individually separating the sliders, across the overall thickness of the substrate along the thickness of the substrate from the front surface of the substrate, at least without completely cutting the suspension; and a polishing step of bringing a wire saw of a diameter greater than a width of a portion cut by the cutting step into contact with the cut portion and then pressing the wire saw against the slider while sliding the wire saw in a longitudinal direction, thereby polishing a surface in contact with the wire saw and chamfering the contact surface into the concave curved surface.

Still another method of working a slider of the invention having a polyhedral outline and having a surface facing a magnetic recording medium, for chamfering into a concave curved surface at least one of edges of the outline of the slider on the periphery of the surface facing the magnetic recording medium comprises: a multi-bonding step of forming an array of a plurality of sliders on one substrate; a notching step of cutting a notch at a boundary for individually separating the multi-bonded sliders to some midpoint of a thickness of the substrate along the thickness of the substrate from the front surface of the substrate; and a polishing step of bringing a wire saw of a diameter greater than a width of the notch into contact with the notch and then pressing the wire saw against the slider while sliding the wire saw in a longitudinal direction, thereby polishing a surface in contact with the wire saw and chamfering the contact surface into the concave curved surface.

In the method of working a slider of the invention, the notch is previously cut to some midpoint of the thickness of the substrate or the substrate is further cut across the overall thickness of the substrate, and then the wire saw is brought into contact with the notch. Thus, the notch serves as a guideline and guides the wire saw to an appropriate boundary, i.e., a polishing position by self alignment. Therefore, polishing can take place at a precise position.

Moreover, the edge thus polished has such a concave curved surface in cross section as can implement performance suitable for the slider, and the edge has an extremely smooth surface having no chipping or protrusion. Moreover, a dimension of a portion to be chamfered and a radius of the inverted R of the concave curved surface of the cross section of the portion can be freely selected (set) in accordance with the radius of the wire saw to be used.

Furthermore, in the method of working a slider of the invention, polishing is performed by the use of the wire saw, and thus the polished surface has the concave curved surface in cross section as described above. In a process of manufacturing the slider having a rail shape as an ABS, this is more suitable for the formation of the so-called two-stage structure, i.e., a structure in which a side surface of the rail of the ABS is formed inward by a predetermined distance from the side surface of the slider. Moreover, a distance between the side surface of the rail of the ABS and the side surface of the slider in the two-stage structure can be freely selected (set) in accordance with the radius of the wire saw. The working method of the invention having many advantages as described above is a very simple working method which is feasible without the need for any complicated step.

In the method of working a slider of the invention, the polishing step may further include the step of bringing the wire saw into contact with a corner at which the edges of the slider cross each other, with the edge of the slider inclined along a length of the wire saw, and then pressing the wire saw against the corner of the slider while sliding the wire saw along the length of the wire saw, thereby polishing the surface in contact with the wire saw and chamfering the contact surface so that the contact surface may have the concave curved surface in cross section.

Thus, polishing takes place with the slider inclined along the length of the wire saw, thereby making it possible to polish, in particular, the corner of the slider and to chamfer the corner so that the corner may have the concave curved surface in cross section.

Moreover, in the method of working a slider of the invention, the polishing step may be performed through the use of slurry containing abrasive grains having a particle diameter of 5 $\mu$m or less and the wire saw.

That is, an empirical rule that a damaged layer and a chipping produced near the edge at the time of cutting of the slider are both 5 $\mu$m at the maximum has been heretofore obtained from previous practical manufacturing experience. It is therefore desirable that the substrate is cut by the wire saw by using the slurry containing abrasive grains having a particle diameter of 5 $\mu$m or less in order to control a stock allowance equal to or less than 5 $\mu$m, i.e., a size of the damaged layer and the chipping. However, the invention is not limited to this example. In consideration of a qualitative tendency as described above, the particle diameter of the abrasive grain for use in the slurry can be appropriately determined within a range of a particle diameter of 5 $\mu$m or less so that the particle diameter can be adapted to required smoothness and precision in dimension of cut.

Powders of diamond, sapphire or the like for a general abrasive grain can be used as a material of the above-mentioned abrasive grain. When the slurry is not used, the wire saw having abrasive grains deposited to a wire itself, such as a diamond-electrodeposited wire saw, can be used.

The suspension for supporting the sliders on the rear surface thereof may be joined to the rear surface of the substrate in such a manner that the overall surface of the suspension is in contact with the rear surface of the substrate. Alternatively, the suspension may be joined to only devices or sliders so as not to be joined to a cutting allowance between the devices or the sliders, thereby supporting the devices or the sliders by only the joint portions. Moreover, temporary bonding using an adhesive or temporary support by applying a negative pressure such as an adsorptive method may be adopted as a method of supporting the devices or the sliders.

Moreover, in the method of working a slider of the invention, the devices or the sliders may be removed from the suspension after the polishing step. Alternatively, for example, the suspension is made of an insulating material and the substrate is cut together with the suspension into the individual devices or sliders, whereby the insulating suspension can be used as an insulating layer in each device or slider finally obtained. Thus, the suspension may be also used as a part of a structure of each of the devices or sliders like the insulating layer, without being removed from the individual devices or sliders.

Other and further objects, features and advantages of the invention will appear more fully from the following description.

DETAILED DESCRIPTION OF THE PREFERRED EMBODIMENTS

An embodiment of the invention will be described in detail below with reference to the accompanying drawings.

Figure 1:
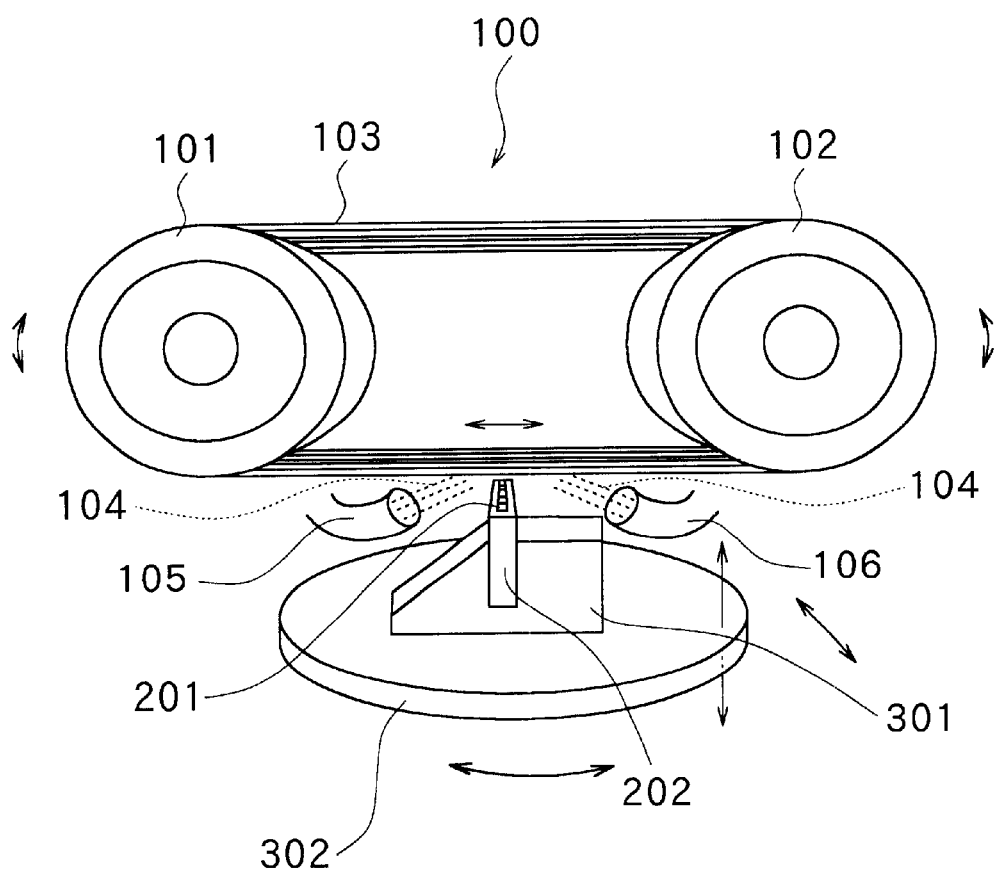
FIG. 1 is a schematic illustration of a principal part of a constitution of a wire saw apparatus for use in a working method according to the invention and a bar having an array of a plurality of sliders to be polished by the wire saw apparatus.

FIG. 1 is a schematic illustration of a principal part of a constitution of a wire saw apparatus 100 for use in a working method according to an embodiment of the invention and a bar 201 having an array of a plurality of sliders 200, each of which has an edge to be polished by the wire saw apparatus 100. FIGS. 2A to 2D are schematic illustrations of a sequence of steps of polishing the edges of the sliders 200.

The wire saw apparatus 100 has the principal part comprising two work rollers 101 and 102 facing each other substantially parallel to each other; a wire saw 103 wound around the two work rollers 101 and 102; nozzles 105 and 106 for feeding slurry (grinding solution) 104 to a portion of the wire saw 103 to be brought into contact with the bar 201 to be worked; a collet pedestal 301 for mechanically supporting the bar 201 to be worked; and a work table 302 on which the bar 201 and the collet pedestal 301 are placed and which changes its position relative to the wire saw 103 by making a vertical movement and a horizontal rotation.

Figure 6:
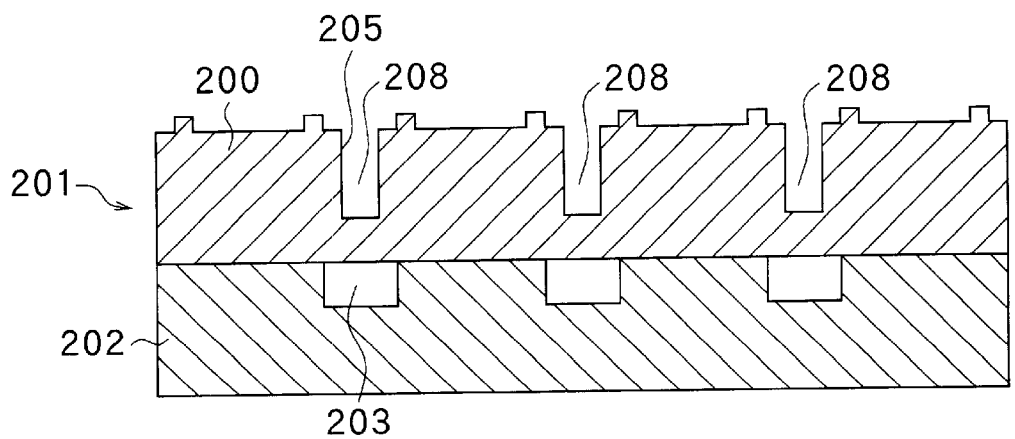
FIG. 6 is an illustration of an example in which a notch is cut at a boundary between the sliders on the bar.

An application of the invention is not limited to only a case in which a substrate is already separated into the bars 201, each of which has the array of the sliders 200, and a suspension 202 is already stuck on a rear surface of each bar 201, as shown in FIGS. 2A to 2D. Besides, it is needless to say that the working method of the invention is also applicable to a case in which a plurality of sliders are multi-bonded on the substrate and grooves 208 are previously cut to some depth along a thickness of the substrate in an outline (contours) of the sliders as shown in FIG. 6, on the substrate.

Next, main steps (a method of separating sliders) of a method of working a slider according to the embodiment will be described with reference to FIGS. 2A to 2D.

Figure 2:
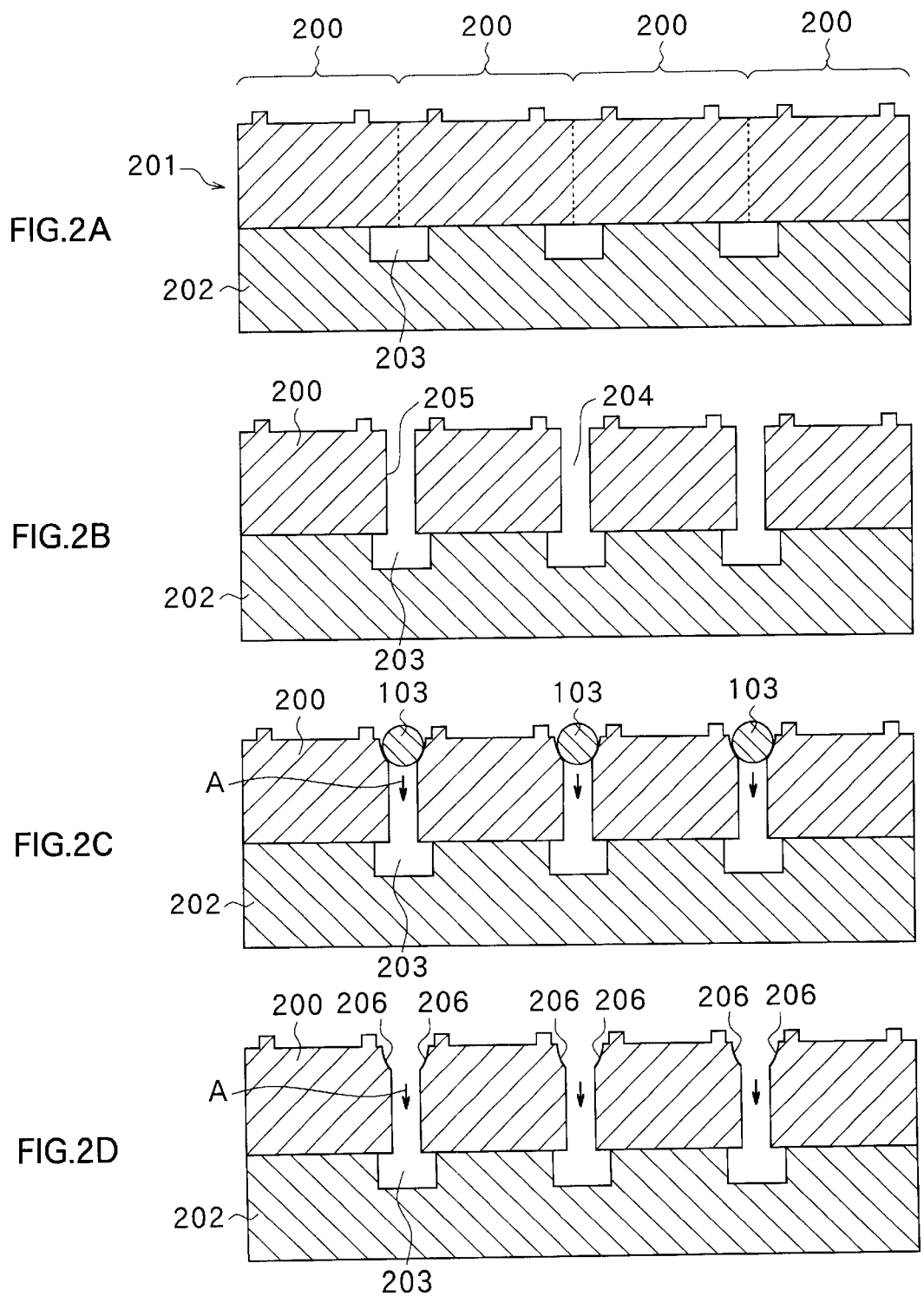
FIGS. 2A to 2D are cross sectional views of a sequence of main steps of a method of working a slider according to the invention.

First, as shown in FIG. 2A, in a supporting step, the suspension 202 for supporting the sliders 200 is stuck on the rear surface of the substrate, i.e., the bar 201, opposite to the front surface thereof on which the sliders 200 are multi-bonded. Wax or the like, which has been heretofore generally used, can be preferably used as an adhesive for use in the step. Alternatively, the suspension 202 may adhere to the bar 201.

In the embodiment, in the suspension 202, a clearance 203 is previously provided in a portion corresponding to a boundary between adjacent sliders 200, i.e., a width of cut. In cutting to be described later, the clearance 203 is taken as a condition for approximately uniform cutting between the front surface of the bar 201 and the clearance 203. Although the provision of the clearance 203 is more desirable, the clearance 203 is not indispensable. It therefore goes without saying that the clearance 203 can be eliminated.

Then, as shown in FIG. 2B, in a cutting step, the sliders 200 included in one bar 201 are cut at appropriate boundaries across the overall thickness along the thickness from the front surface of the bar 201 so that the sliders 200 are individually separated from one another. In the embodiment, the suspension 202 is not cut at this time. Even if an upper portion of the suspension 202 is slightly deeply cut or damaged, there is no problem as long as the suspension 202 is not completely cut at this time. In short, it is essential only that the individual sliders 200 of the cut bar 201 can be joined to the suspension 202.

In the cutting step, a cutting method of the related art using a general diamond grinding wheel, for example, is adopted. Cutting using the diamond grinding wheel has many problems: a cut surface or an edge has a great degree of surface roughness as mentioned above; poor profile or chipping often occurs; and a cutting allowance varies considerably due to wear in the grinding wheel and thus the cutting allowance has low accuracy of dimension. However, because the diamond grinding wheel may be considered as a rigid body, a very high degree of alignment precision of a cutting position, i.e., pitch precision of a cutting line can be obtained through the use of a slicer having submicron feed precision or other means.

Once a first cutting step takes place with high pitch precision and then a cut gap, i.e., a cut groove 204 formed through the cutting step is provided at such a high-precision position, the wire saw 103 is self-aligned along the cut groove 204 formed at the high-precision position because a wire saw to be described later is flexible. Therefore, a polishing position can be accurately positioned.

Even by the use of the wire saw which obtains good surface smoothness of a portion brought into contact with the wire saw during polishing but intrinsically has difficulty in obtaining high pitch precision, the wire saw 103 is guided to the cut groove 204 formed through the cutting step and therefore high pitch precision can be obtained at the polishing position. In this sense, the cutting method using a general diamond grinding wheel can be preferably adopted in the cutting step.

In the embodiment, an example of the diamond grinding wheel and a detailed method of using the diamond grinding wheel in the cutting step is as follows:

the number of revolutions of the grinding wheel: about 12,000;
  a feed speed: about 90 mm per minute;
  a yarn count of the grinding wheel: No. 800 to No. 1500;
  a diameter of the grinding wheel: about 90 mm;
  a material of the grinding wheel: a metal bond grinding wheel; and
  a cutting allowance: about 160 $\mu$m.

In this example, the pitch precision is set so that a cumulative pitch error of the cut groove 204 in one bar 201 may be equal to or less than 2 $\mu$m.

Figure 3:
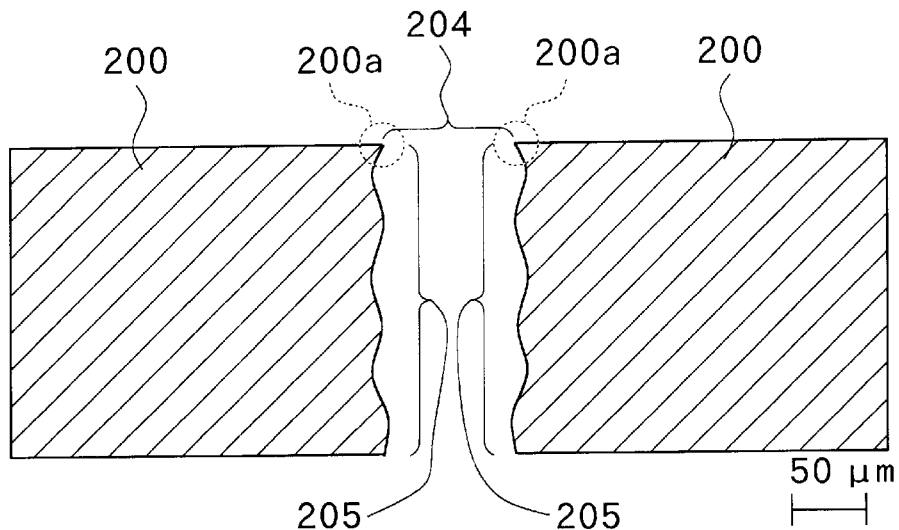
FIG. 3 is an illustration of a state of a cut surface and an edge of more particularly a part of a front surface obtained through cutting, wherein the state observed by a photomicrograph is copied based on the photomicrograph.

FIG. 3 is an illustration of a state of the cut surface and the edge of more particularly a part of the front surface obtained through the cutting, wherein the state observed by a photomicrograph is copied based on the photomicrograph. It can be seen from FIG. 3 that a cut surface 205 is clearly rough and chipping 200a is produced on the edge. In this state, surface roughness (Ra) of the cut surface 205 was equal to 20 nm to 30 nm, a size of the chipping was equal to 5 $\mu$m to 20 $\mu$m and a size of a protrusion (strain) was equal to 5 $\mu$m to 15 $\mu$m. On the other hand, position precision of the cut groove 204, i.e., the pitch precision is extremely high.

Figure 7:
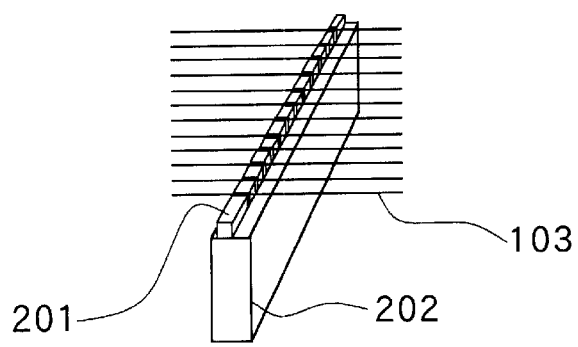
FIG. 7 is an illustration of a state in which a wire saw is brought into contact with an edge portion of a cut groove of the bar substantially parallel to the edge portion.

After cutting, the edge is polished as shown in FIG. 2C. That is, the wire saw whose diameter is greater than the width of a portion cut by the cutting step, i.e., the width of the cut groove 204 is brought into contact with a portion of the cut groove 204 of the bar 201 as shown in FIG. 7. While the wire saw is slid in a longitudinal direction, the wire saw is pressed along the thickness of the bar 201, i.e., in the direction indicated by the arrow A, whereby the edge of each slider is chamfered. Thus, as shown in FIG. 2D, while the edge of each slider is chamfered into a concave curved surface in cross section, an extremely smooth polished surface 206 is obtained.

Figure 5:
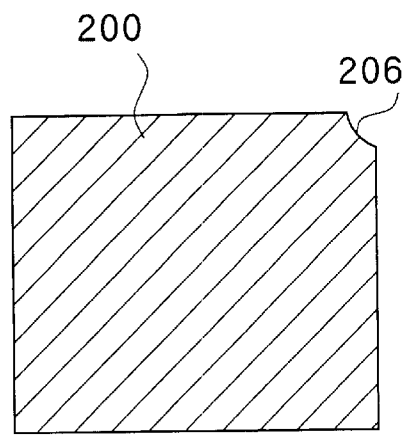
FIG. 5 is a schematic illustration of a state of a portion of a polished surface of the edge obtained through a polishing step, wherein the outline of the state observed by a microscope is copied based on the photomicrograph.

FIG. 5 is a schematic illustration of a state of the edge thus formed, more particularly a part of the front surface, wherein the outline of the state observed by a microscope is copied based on the photomicrograph. It can be seen that the polished surface 206 has few asperities and chippings and is extremely smooth, compared to the cut surface obtained through the above-mentioned first cutting step shown in FIG. 3.

An example of a method of using the wire saw in the step is as follows:

a wire speed: 360 m/min;
  a wire dispensing speed: 3 m/min;
  a wire tension: 3 kg;
  a width of the above-mentioned cut groove 204: about 200 $\mu$m;
  a wire diameter (after cutting by the wire saw): 320 $\mu$m;
  a work feed speed: 0.5 mm/min;
  lapping slurry: oil to which 1–2 wt % of diamond abrasive grains of 0.25 $\mu$m diameter is added;
  a slurry feed rate: 1–2 l/min;
  a working time: 30 seconds to 60 seconds per bar;
  a width of chamfering (polishing): 15 $\mu$m to 20 $\mu$m; and
  a depth of chamfering (polishing): 15 $\mu$m to 20 $\mu$m.

This permits an acceptable protrusion of 2 nm or less and a chipping of 0.5 $\mu$m or less.

A polishing step is actually performed by the use of such a wire saw. As a result, the protrusion (strain) is less than 1 $\mu$m, the size of chipping is less than 0.5 $\mu$m, and the surface roughness (Ra) is less than 2 nm. It has been shown that the cut surface and the edge which are extremely smooth and excellent for side surfaces of the sliders 200 are formed.

Figure 4:
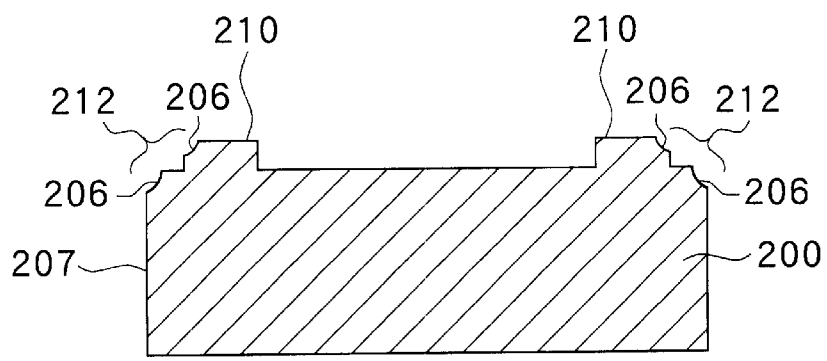
FIG. 4 is a schematic illustration of a cross-sectional shape of an outline of a slider formed by applying the working method of the invention to a slider of a two-stage structure.

FIG. 4 is a schematic illustration of a cross-sectional shape of a slider formed by applying the working method of the invention to a slider of the so-called two-stage structure. The slider 200 has rails 210 of an ABS, each of which is formed inward by a predetermined distance from a side surface 207. A staged portion 212 close to the side surface 207 can be also polished by using the working method of the invention.

Figure 8:
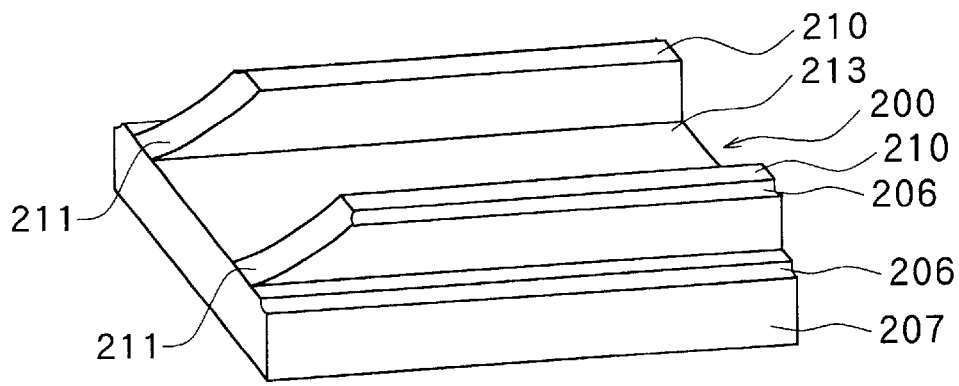
FIG. 8 is an illustration of an example in which the working method of the invention is applied to a formation of an inclined surface on an end of an air inlet of a rail of an ABS.

Furthermore, the method of working the slider of the invention can be preferably used to form the slider 200 having inclined surfaces 211 on the ends of the rails 210 of the ABS close to an air inlet as shown in FIG. 8.

In the slider 200, a periphery of a surface 213 facing a magnetic recording medium (not shown) and the polished surfaces 206 of the edges of the rails 210 are chamfered into the concave curved surface, and thus the surface is an extremely smooth surface having no chipping or protrusion. If the slider 200 assumes an inclined posture toward the magnetic recording medium due to some external perturbations or the like, the slider 200 tends to move closer to the surface of the magnetic recording medium. However, the polished surfaces 206 of the edges of the slider 200 or the inclined surfaces 211 on the ends of the rails 210 of the ABS have the concave curved surface which is hollowed like an inverted R in cross section. Thus, a dimension of the hollowed portion permits reducing the probability of contact of the slider 200 with the surface of the magnetic recording medium.

Moreover, like the slider 200, the polished surfaces 206 and the inclined surfaces 211, which have the concave curved surface having an inverted R shape in cross section, are formed on the edges and on the ends of the ABS, respectively, on the periphery of the surface facing the magnetic recording medium. Thus, a hydrodynamic function of such a cross-sectional shape allows pressure to be generated in the direction in which the slider is separated from the surface of the magnetic recording medium, i.e., in a positive direction. That is, assuming that the cross-sectional shapes of the polished surfaces 206 of the edges of the slider and the inclined surfaces 211 on the ends of the ABS are regarded as the profile of a blade, the polished surfaces 206 and the inclined surfaces 211 have the inverted R shape as if they were a lower surface of a blade camber. Such a shape allows generating the positive pressure to the slider 200 in the direction in which the slider is hydrodynamically separated from the surface of the magnetic recording medium. Moreover, in this case, the distance (gap) between the facing surface 213 of the slider 200 or the ABS and the magnetic recording medium such as a magnetic disk is extremely short. Therefore, a relative speed of the air viscously adhering to the surface of the rotating magnetic disk with respect to the slider 200 is high, and also a ground effect between the both acts strongly.

Even if the slider 200 is inclined to the surface of the magnetic recording medium due to some external perturbations, the slider 200 has such a structure that the polished surfaces 206 of the edges of the slider 200 and the inclined surfaces 211 on the ends of the ABS exert a force in the direction in which the slider 200 is separated from the surface of the magnetic recording medium. Thus, it is possible to actively avoid a strong contact of the slider 200 with the surface of the magnetic recording medium.

Furthermore, the polished surfaces 206 of the edges and the inclined surfaces 111 on the ends of the ABS have the concave curved surface having the inverted R shape in cross section. Thus, the concave curved surface functions so as to once decelerate airflow colliding with the concave curved surface and then direct the airflow in a horizontal direction, i.e., in the direction parallel to the magnetic recording medium (or the facing surface of the slider facing the magnetic recording medium). That is, for example, even when dust entering from the outside air into a magnetic recording apparatus or other particles is suspended over or adheres to the surface of the magnetic recording medium and the slider moves close to the surface, the cross-sectional shapes of the polished surfaces 206 of the edges of the slider 200 of the embodiment and the inclined surfaces 211 on the ends of the ABS allow horizontally flowing the dust or particles as well as the airflow just like a fender. Therefore, it is possible to prevent the dust or particles from being hydrodynamically sucked and entering into the gap between the magnetic recording medium and the slider 200. As a result, it is possible to avoid damage such as scratches on the surface of the magnetic recording medium, the surface of the rails 210 of the ABS of the slider 200, a magnetic head portion or the like due to the dust or particles.

Next, a method of working corners of the sliders 200 separated as described above will be described.

Figure 9:
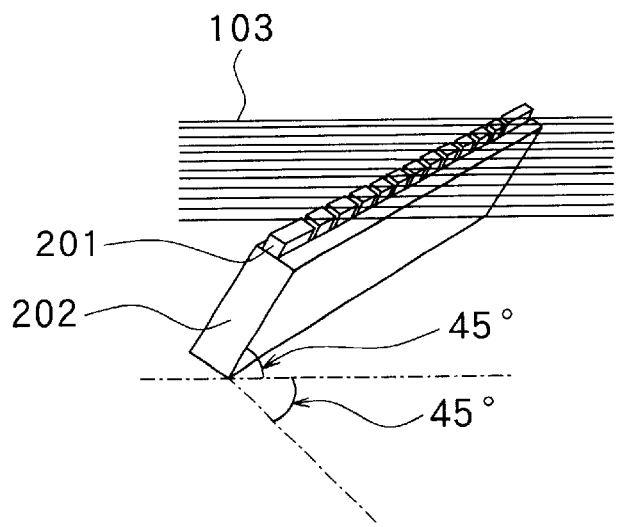
FIG. 9 is an illustration of an example of chamfering in which with the edge of the slider inclined along a length of the wire saw, the wire saw is brought into contact with a corner at which the edges of the slider cross each other.
Figure 10:
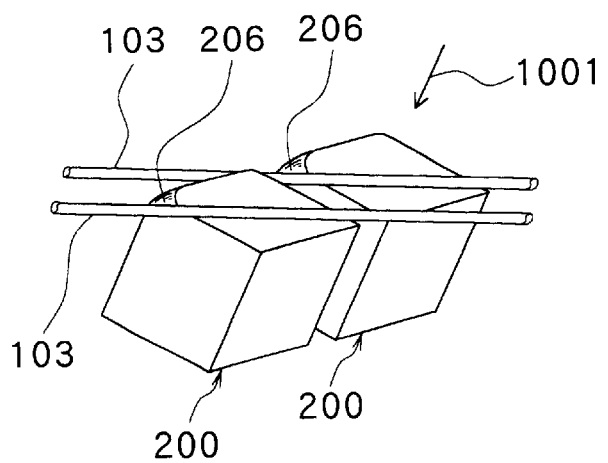
FIG. 10 is an enlarged view of a principal part in chamfering a surface in contact with the wire saw so that the surface may have a concave curved surface in cross section while polishing the surface in contact with the wire saw.

First, as an example is schematically shown in FIG. 9, with the edge of the slider 200 inclined along a length of the wire saw 103, the wire saw 103 is brought into contact with the corner at which the edges of the slider 200 cross each other. Then, while the wire saw 103 is slid in the longitudinal direction and pressed against the corner of the slider 200, the relative positions of the wire saw 103 and the slider 200 are rotated relative to each other. Then, as the principal part is shown in FIG. 10 in enlarged view, while the surface in contact with the wire saw 103 is polished, the contact surface is chamfered so that the surface may have the concave curved surface in cross section, whereby the polished surface 206 can be obtained.

Figure 11:
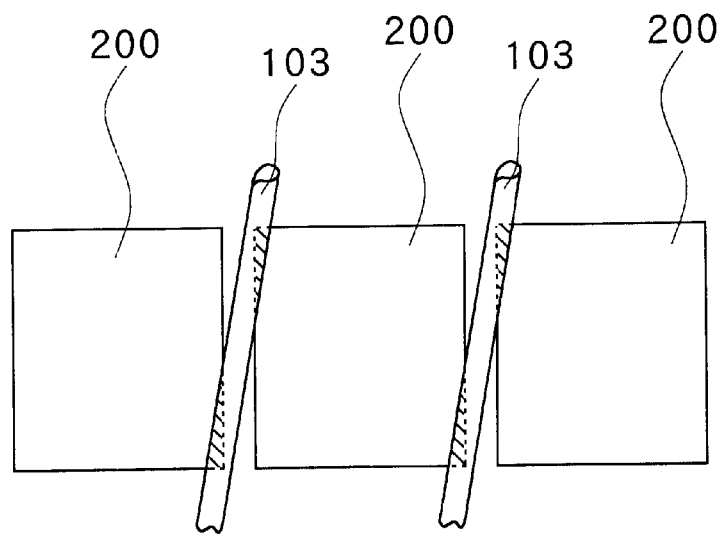
FIG. 11 is an illustration of an example of chamfering in which the wire saw is positioned so that the length of the wire saw may be inclined to an edge line on each slider.
Figure 12:
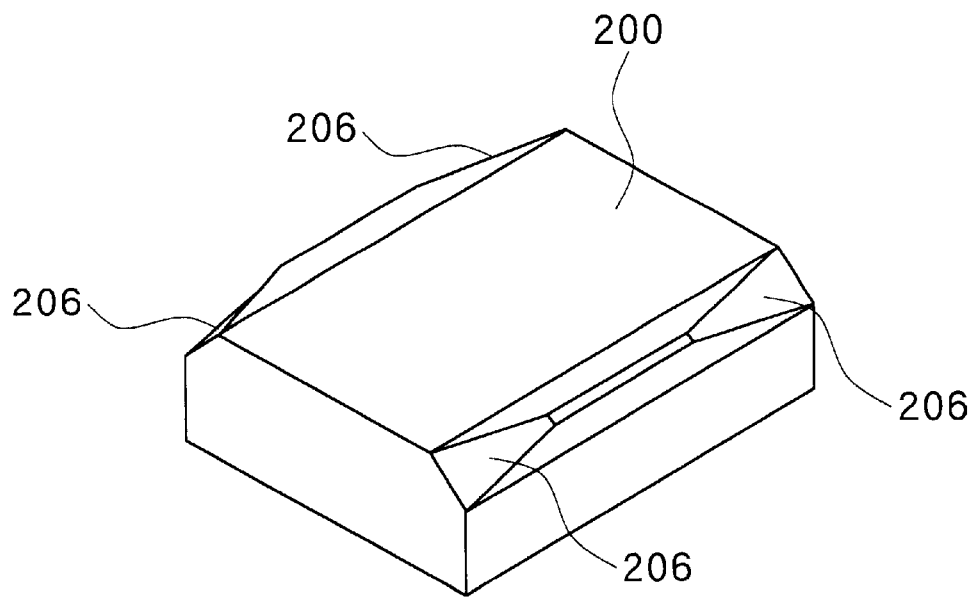
FIG. 12 is an illustration of an example of a shape of the slider formed by chamfering in which the wire saw is positioned so that the length of the wire saw may be inclined to the edge line on each slider.

Moreover, the relative positions of the wire saw 103 and the slider 200 are rotated relative to each other as described above, whereby an outline shape of the polished surface 206 seen from above the slider 200 (from the direction indicated by the arrow 1001 in FIG. 10) is formed into a substantial quadrant. Alternatively, as shown in FIG. 11 in view seen from the direction indicated by the above-mentioned arrow 1001 in FIG. 10, the wire saw 103 is positioned so that the length of the wire saw 103 may be inclined to an edge line on each slider 200, and thus polishing takes place with an appropriate tension kept, whereby chamfering can also take place so that the width of each corner may be reduced as shown in FIG. 12.

Figure 13A:
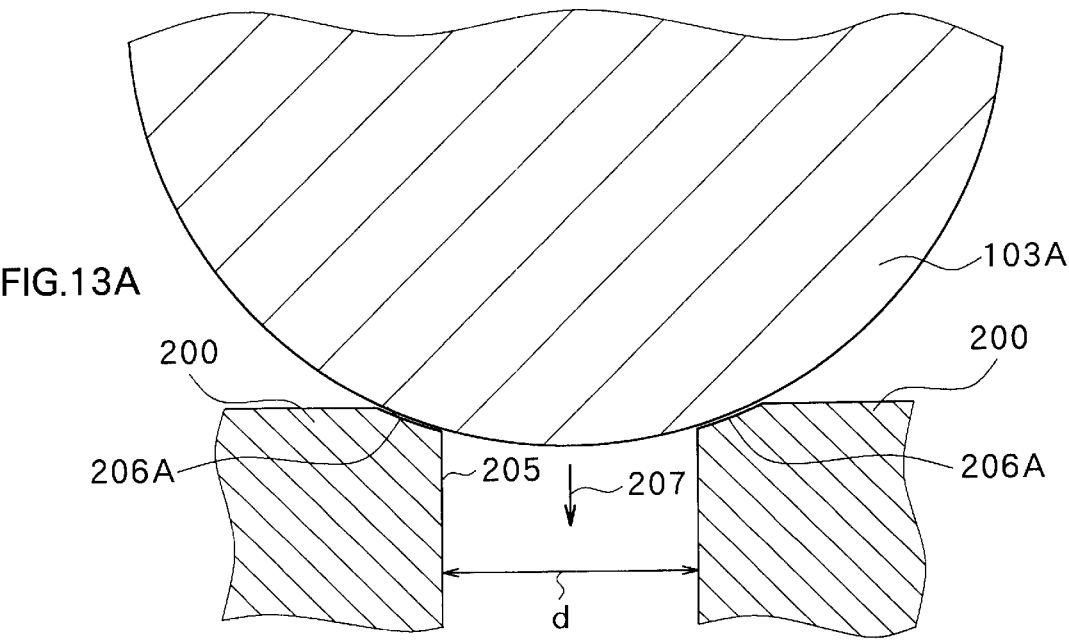
FIGS. 13A and 13B illustrate a working state using the wire saw having a large diameter and a working state using the wire saw having a small diameter, respectively.
Figure 13B:
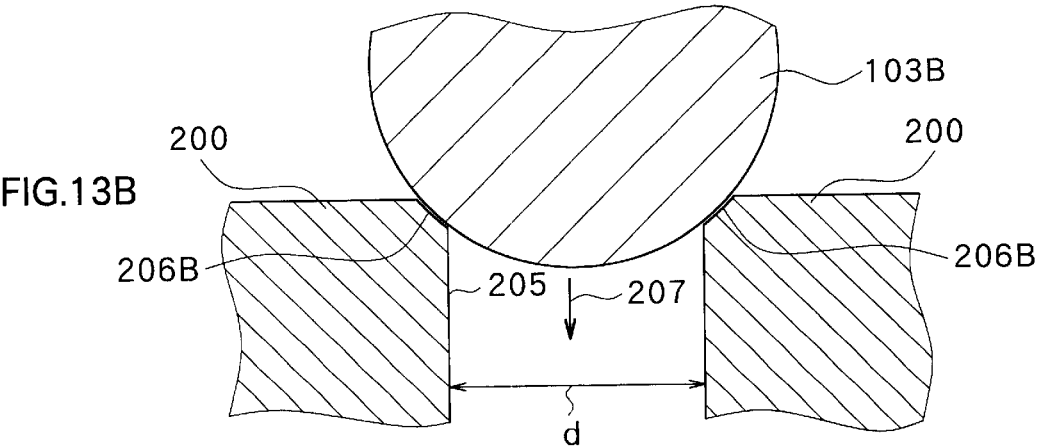
Figure 14A:
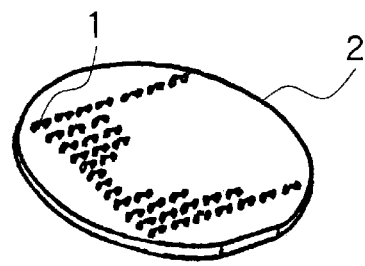
FIGS. 14A to 14F illustrate an example of a general slider working step of the related art.
Figure 14B:
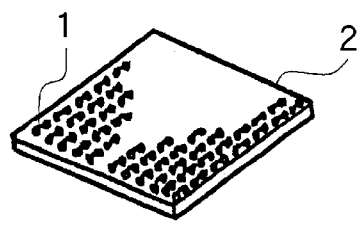
Figure 14C:
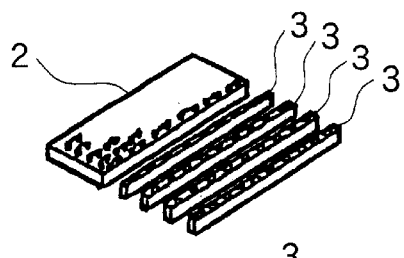
Figure 14D:
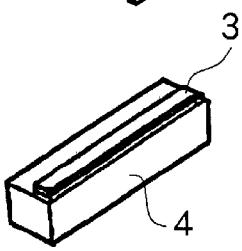
Figure 14E:
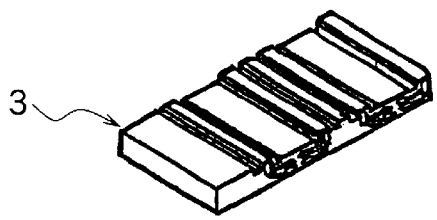
Figure 14F:
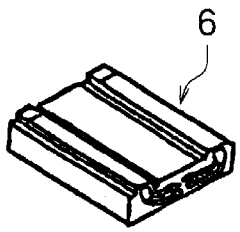

Moreover, as schematically shown in FIGS. 13A and 13B, in the case of the same width d of the cut groove 204 of the slider 200 and the same depth to which the wire saw 103 is pressed along the thickness of the slider 200, a dimension of width and a radius of curvature of a polished surface 206A obtained by using a wire saw 103A having a large diameter (see FIG. 13A) are larger than the dimension of width and the radius of curvature of a polished surface 206B obtained by using a wire saw 103B having a small diameter (see FIG. 13B).

Furthermore, when the wire saws 103 having different diameters are used under the same condition as the above-mentioned condition, an angle of the polished surface 206 to the cut surface 205 obtained by using the wire saw 103A having the large diameter is approximately 90 degrees larger than the angle of the polished surface 206 to the side surface 205 obtained by using the wire saw 103B having the small diameter. Accordingly, in consideration of such a tendency, the wire saw 103 having such a diameter as can obtain the polished surface 206 or the ABS inclined surface 211 (which is also a type of polished surface of the edge) having a desired angle and dimension can be used, and the depth to which the wire saw 103 is pressed can be appropriately set.

After polishing takes place as described above, the sliders 200 are cut into the individual sliders 200 and then the individual sliders 200 are separated from the suspension 202, whereby the sliders 200 completely individually separated can be obtained.

In the embodiment, it has been described that the sliders 200 are finally separated from the suspension 202. However, the invention is not limited to the embodiment. For example, the suspension 202 is made of an insulating material and the sliders are cut together with the suspension 202 into the individual sliders 200, whereby the insulating suspension 202 can be used as an insulating layer in each slider 200 finally obtained. Thus, the suspension 202 can be also used as the insulating layer constituting a part of a structure of each of the sliders 200, without being removed from the individual sliders 200.

Moreover, in the same manner as the above-described embodiment, the invention can be suitably used in a step of separating levitation-type heads of a structure in which an optical module for magneto-optical recording, instead of a magnetic head, is mounted on a tip of a suspension arm; a step of separating levitation-type heads of a structure having both of a magnetic head and an optical head for magneto-optical recording; or the like.

Alternatively, in the same manner as the above-described embodiment, the invention can be suitably used in a step of separating contact-type magnetic heads or optical heads including a contact pad for contacting the surface of the magnetic disk without damaging the surface of the magnetic disk, or the like.

As described above, according to a slider of the invention, the edge on the periphery of the surface facing the magnetic recording medium is chamfered into the concave curved surface. Thus, the surface is an extremely smooth surface having no chipping or protrusion. Moreover, the edge on the periphery of the surface of the slider facing the magnetic recording medium is formed into the concave curved surface in cross section. Thus, even when the slider is inclined to the surface of the magnetic recording medium, it is possible to reduce the probability of strong contact of the slider with the surface of the magnetic recording medium. Therefore, the following effect is achieved. It is possible to implement a magnetic head that is available with high reliability without causing the damage to the magnetic disk and a read/write error when the magnetic head, for example, is incorporated and used in the HDD.

Moreover, according to a method of working a slider of the invention, a notch is previously cut to some midpoint of the thickness of the substrate or the substrate is further cut across the overall thickness of the substrate, and then the wire saw is brought into contact with the notch. Thus, the notch serves as a guideline and guides the wire saw to an appropriate boundary (polishing position) by self alignment, whereby polishing can take place at a precise position. The effect of being able to easily manufacture the slider of the invention is therefore achieved.

Obviously many modifications and variations of the present invention are possible in the light of the above teachings. It is therefore to be understood that within the scope of the appended claims the invention may be practiced otherwise than as specifically described.

What is claimed is:

1. A slider moving relative to a magnetic recording medium, the slider comprising:

a body having a surface facing the magnetic recording medium; and at least one rail that is provided on the surface facing the magnetic recording medium, the at least one rail having at least one end that is chamfered into a concave curved surface.

2. The slider according to claim 1, wherein the rail has at least one side that is chamfered into a concave curved surface.

3. The slider according to claim 2, wherein the body has at least one side that is chamfered into a concave curved surface.

4. The slider according to claim 1, wherein the body has at least one side that is chamfered into a concave curved surface.

* * * * *